UNITED STATES PATENT OFFICE.

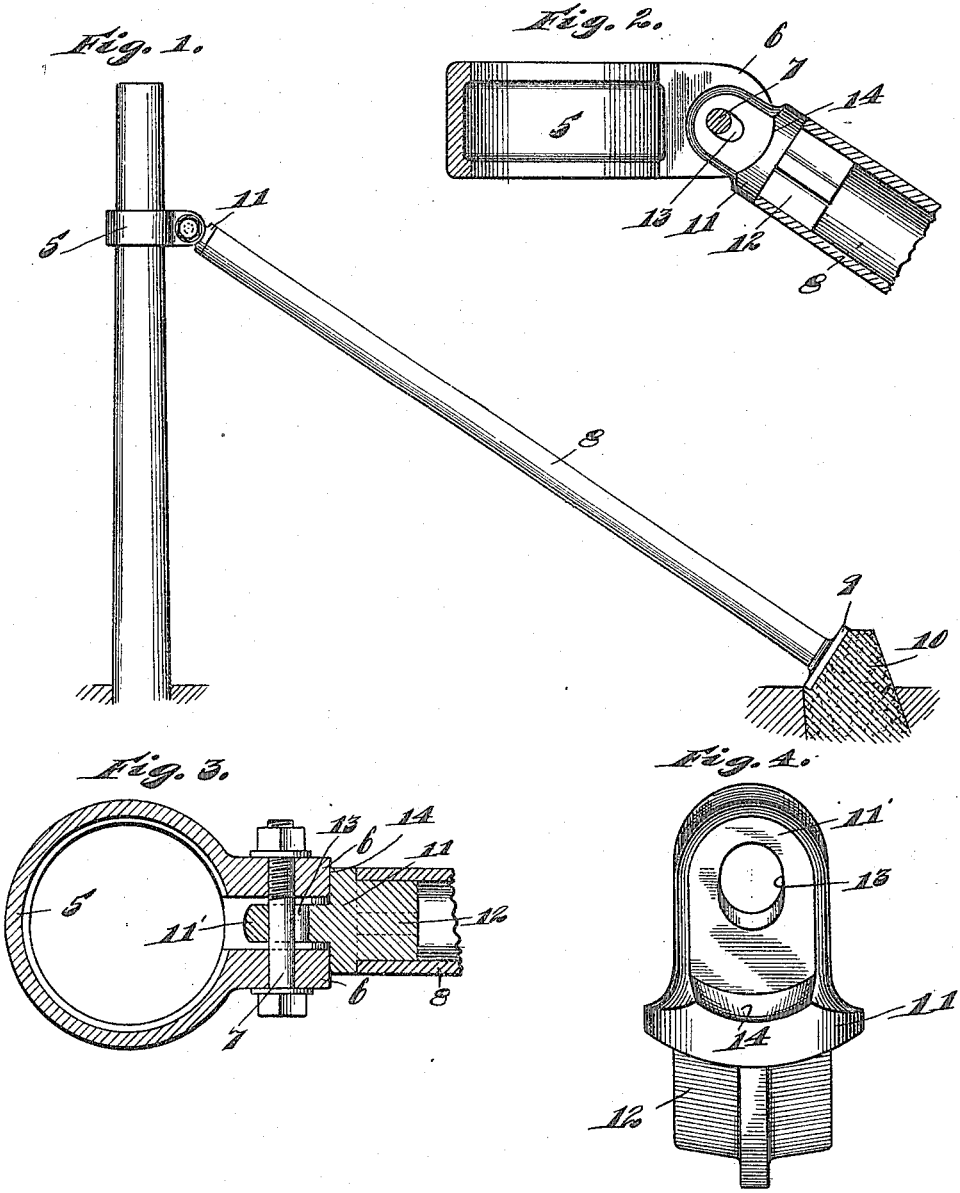

RICHARD A. SELWAY, OF CHICAGO, ILLINOIS.

FENCE-POST-BRACE CONSTRUCTION.

1,221,481. Specification of Letters Patent. Patented Apr. 3, 1917.

Application filed March 31, 1915. Serial No. 18,261.

*To all whom it may concern:*

Be it known that I, RICHARD A. SELWAY, a citizen of the United States, and a resident of the city of Chicago, county of Cook, and State of Illinois, have invented certain new and useful Improvements in Fence-Post-Brace Construction, of which the following is a specification.

My invention relates to improvements in fence post brace constructions, and has for its object the provision of a simple and efficient construction of this character.

The invention consists in the combinations and arrangements of parts hereinafter described and claimed.

The invention will be best understood by reference to the accompanying drawing forming a part of this specification, and in which, Figure 1 is a side view of a construction embodying my invention, shown in position of use, Fig. 2, an enlarged vertical section of the same, Fig. 3, a horizontal section of the construction, and Fig. 4, a perspective view of a bearing head employed in the construction.

The preferred form of construction, as illustrated in the drawing, comprises a clamping member 5 in the form of a contractible ring open at one side and provided with lugs 6 adjacent said opening. The lugs 6 are connected by means of a clamping bolt 7 and by means of which the member 5 may be readily clamped to a fence post, as will be understood. A brace 8 is operatively connected with the clamping member 5, said brace 8 being provided at its lower end with a bearing foot 9 seated on a concrete abutment 10, as indicated. A bearing head 11 is arranged at the upper end of the brace 8, said bearing head being provided with a cross-shaped projection 12 fitting snugly within the upper end of the brace 8. The head 11 is provided with a lug 11' fitting loosely between lugs 6, as indicated in Fig. 3, and provided with an elongated slot 13 slidably and pivotally engaging bolt 7. Head 11 is also provided with circular bearing surfaces 14 resting against the under outer surfaces of the lugs 6 which are also made circular to correspond.

By this arrangement a solid and rigid bearing is provided for the lugs 6 which will relieve the clamping bolt 7 of all strain. The great freedom of adjustment afforded the brace 8 by this arrangement facilitates the proper positioning of the fence post notwithstanding any inequalities in the ground.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a member adapted to be secured to a fence post and provided with a pair of spaced lugs having circular outer ends, a pivot pin extending through said lugs, a brace, a head on said brace arranged between said lugs and there being a longitudinal slot in said head to receive said pin, and arcuate bearing surfaces on said head to engage the circular ends of said lugs, said slot being radially disposed with relation to said bearing surfaces, substantially as described.

2. The combination of a clamping member in the form of a contractible ring open at one side and provided with lugs adjoining said opening; a clamping bolt connecting said lugs; a brace; and a head arranged at the end of said brace, said head being provided with a lug fitting loosely between the lugs on said clamping member and provided with an elongated slot engaging said bolt, there being bearings at the sides of said head fitting against the ends of the lugs on said clamping member, substantially as described.

3. The combination of a clamping member in the form of a contractible ring open at one side and provided with lugs adjoining said opening, said lugs being circular at their outer end; a clamping bolt connecting said lugs; a brace; and a head arranged at the end of said brace, said head being provided with a lug fitting loosely between the lugs on said clamping member and provided with an elongated slot engaging said bolt, there being circular bearings at the sides of said head fitting against the circular ends of the lugs on said clamping member, substantially as described.

In testimony whereof I have signed my name to this specification in the presence of two subscribing witnesses.

RICHARD A. SELWAY.

Witnesses:
JOSHUA R. H. POTTS,
HELEN F. LILLIS.

Copies of this patent may be obtained for five cents each, by addressing the "Commissioner of Patents, Washington, D. C."